United States Patent
Mealey et al.

[11] Patent Number: 5,918,048
[45] Date of Patent: Jun. 29, 1999

[54] BOOTING AN OPERATING SYSTEM USING SOFT READ-ONLY STORAGE (ROS) FOR FIRMWARE EMULATION

[75] Inventors: Bruce Gerard Mealey, Austin; Randal Craig Swanberg, Round Rock; Michael Stephen Williams, Austin, all of Tex.

[73] Assignee: International Business Machines Corporation, Armonk, N.Y.

[21] Appl. No.: 08/818,985

[22] Filed: Mar. 17, 1997

[51] Int. Cl.[6] .......................................................... G06F 9/44
[52] U.S. Cl. ............................................. 395/652; 395/500
[58] Field of Search ............................. 395/500, 651–653

[56] References Cited

U.S. PATENT DOCUMENTS

| | | | |
|---|---|---|---|
| 3,955,180 | 5/1976 | Hirtle | 395/500 |
| 5,386,561 | 1/1995 | Huynh et al. | |
| 5,394,547 | 2/1995 | Correnti et al. | |

*Primary Examiner*—Thomas M. Heckler
*Attorney, Agent, or Firm*—Richard A. Henkler; Jack V. Musgrove; Andrew J. Dillon

[57] ABSTRACT

An improved method of providing an operating system for a computer by defining an interface between the operating system and the computer's firmware. An executable file (soft ROS) is placed in a boot image so as to run, before execution of the real operating system, in response to the firmware seeking the operating system. The soft ROS includes instructions to determine whether the firmware conforms to the standardized interface. If so, then no special action is taken and control is passed to the operating system, but if the firmware is non-conforming in any manner, the soft ROS executes a firmware emulation module which provides the interface with the operating system. The firmware emulation module can provide missing dependencies of the firmware to the operating system, fix a defect in the firmware, or translate functions of the firmware to the pre-defined interface. This method isolates the operating system from firmware dependencies, making the operating system more portable.

17 Claims, 2 Drawing Sheets

BOOTING AN OPERATING SYSTEM USING SOFT READ-ONLY STORAGE (ROS) FOR FIRMWARE EMULATION

BACKGROUND OF THE INVENTION

1. Field of the Invention

The present invention generally relates to computer systems and more particularly to an operating system which is more easily adapted to run on computers having different firmware designs.

2. Description of the Prior Art

The basic structure of a conventional computer system 10 is shown in FIG. 1. The heart of computer system 10 is a central processing unit (CPU) or processor 12 which is connected to several peripheral devices, including input/output (I/O) devices 14 (such as a display monitor and keyboard) for the user interface, a permanent memory device 16 (such as a hard disk or floppy diskette) for storing the computer's operating system and user programs, and a temporary memory device 18 (such as random-access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction 20 with those shown in the block diagram of FIG. 1; for example, a display adapter connected to processor 12 might be used to control a video display monitor.

Computer system 10 also includes firmware 24 whose primary purpose is to seek out and load an operating system from one of the peripherals (usually permanent memory device 16) whenever the computer is first turned on. The process of seeking out and loading the operating system is referred to as "booting" the computer. Computer system 10 may be designed to allow firmware 24 to initialize (or re-initialize) an operating system without turning the computer off and back on again (a "soft" boot). Firmware 24 is essentially a series of machine instructions which are typically stored in a read-only storage (ROS) device, such as read-only memory (ROM). As shown in the flow chart of FIG. 2, after power to computer system 10 is turned on (or a soft boot command has been received), processor 12 begins to execute the firmware instructions and seeks out an operating system (26). If an operating system is found, it is loaded (28) into temporary memory 18. Thereafter, the operating system allows other application layers to be added, i.e., user software programs (30). In this manner, a given computer hardware construction can be adapted to run a variety of operating systems and user applications.

The foregoing description generally applies to any type of operating system, including two popular operating systems known as MSDOS and UNIX (MSDOS is a trademark of Microsoft Corp.; UNIX is a trademark of UNIX System Laboratories), but the present invention has particular application to UNIX. UNIX is a multi-user, multi-tasking operating system which is available from a variety of sources with different versions. These include, among others, System V (American Telephone & Telegraph), AIX (International Business Machines), and Mach (NeXT Computers). FIG. 3 illustrates a boot image 32 that is loaded as a UNIX operating system. Boot image 32 includes a base kernel portion 34 and a boot filesystem portion 36. Kernel 34 acts as the intermediary between user programs and hardware devices, and includes, among other things, device drivers. Boot filesystem 36 is the RAM-based file system that provides user commands to manipulate computer objects, such as files, directories, and symbolic links. When firmware 24 sees boot image 32 (such as on a floppy diskette, hard disk, or CD-ROM disk), it transfers control to that operating system (kernel 34) after loading boot filesystem 38.

A given operating system can be adapted to run on various types of hardware platforms. With some operating systems, such as MSDOS, a given copy of the operating system can be used to boot computers manufactured by many sources, since the hardware architecture and BIOS (basic input and output system) functions remain constant from manufacturer to manufacturer. Other operating systems, like UNIX, must be more portable due to significant differences between the various types of hardware that have been designed to run UNIX. In this regard, boot filesystem 36 includes information that is hardware dependent, such as the PAL (Portability Assist Layer or Platform Abstraction Layer), which contains the specific instructions for communicating with the particular hardware devices of a given manufacturer.

One other factor, similar to hardware dependencies, that can make an operating system less portable is its dependency on firmware. Most operating systems have many firmware dependencies. Two specific areas that affect portability of an operating system are hardware initialization and a mechanism for describing the capabilities of the computer system. These functions as performed by a system's firmware vary widely. Operating systems have to be modified to support these differences with changes that can be scattered throughout the software, i.e., for a UNIX-type workstation, the differences are not addressed by the PAL, and so the kernel must be rebuilt, which can be a major issue when it comes to porting an operating system to new hardware. It also can become an issue when a system's hardware/firmware do not work correctly, or when hardware-specific states or functions are left by the firmware which are incompatible with the operating system. For example, the kernel cannot clear a hot interrupt that is left from the firmware. Sometimes the kernel also needs certain information which would normally be passed by control blocks in the firmware, such as the type of processor in the computer system, the bus architecture, the time and date, etc. It would, therefore, be desirable to provide a method to isolate an operating system from firmware dependencies. It would be further advantageous if the method allowed correction or modification of firmware functionality.

SUMMARY OF THE INVENTION

It is therefore one object of the present invention to provide an improved operating system for a computer.

It is another object of the present invention to provide such an operating system that achieves greater portability by reducing firmware dependencies.

It is yet another object of the present invention to provide a means to correct any defects in the firmware, or otherwise change the firmware functionality, to ensure proper installation of the operating system.

The foregoing objects are achieved in a method of loading an operating system generally comprising the steps of determining whether the firmware conforms to a pre-defined operating system interface, executing firmware emulation code if the firmware does not conform to the pre-defined interface, and then loading an operating system which uses the pre-defined interface OS/firmware interface. The instructions for determining whether the firmware is conforming are contained in a boot image which is loaded in response to the firmware seeking out an operating system. The boot image also has the firmware emulation code and the operating system (e.g., a kernel and boot filesystem for a UNIX-type workstation). The firmware emulation code can provide missing dependencies of the firmware to the operating system, fix a defect in the firmware, or even translate functions of the firmware to the pre-defined interface. The boot image is provided on a media located in an input device connected to the computer processor. The media can be removable, e.g., a floppy (magnetic) diskette or a CD-ROM (optical) disk.

This method isolates the operating system from firmware dependencies, making the operating system more portable, and has other advantages, such as simplifying testing or fixing defective firmware since it places all dependencies on firmware in one module.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
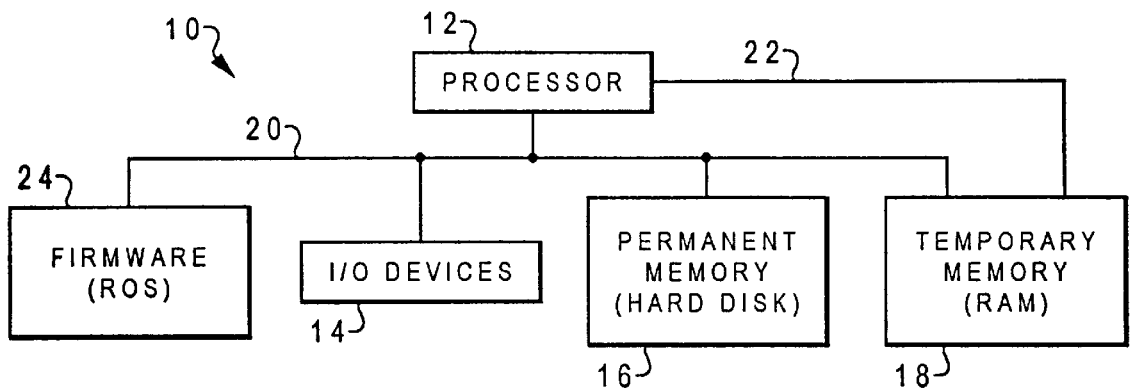
FIG. 1 is a block diagram of a conventional computer system.
Figure 2:
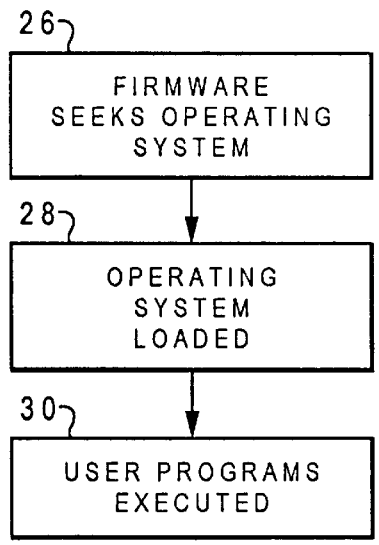
FIG. 2 is a flow chart depicting the basic boot sequence of a conventional operating system.
Figure 3:
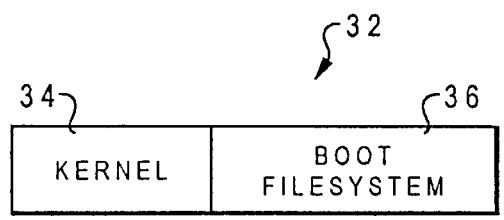
FIG. 3 is a representation of a prior-art UNIX boot image.

The present invention is directed to a method of loading an operating system (OS) on a computer which has a particular firmware design out of many possible firmware designs. The computer system's hardware may include the various components shown in FIG. 1, but the computer system is not necessarily conventional, i.e., it could include new hardware components as well, or have a novel interconnection architecture for existing components.

Figure 4:
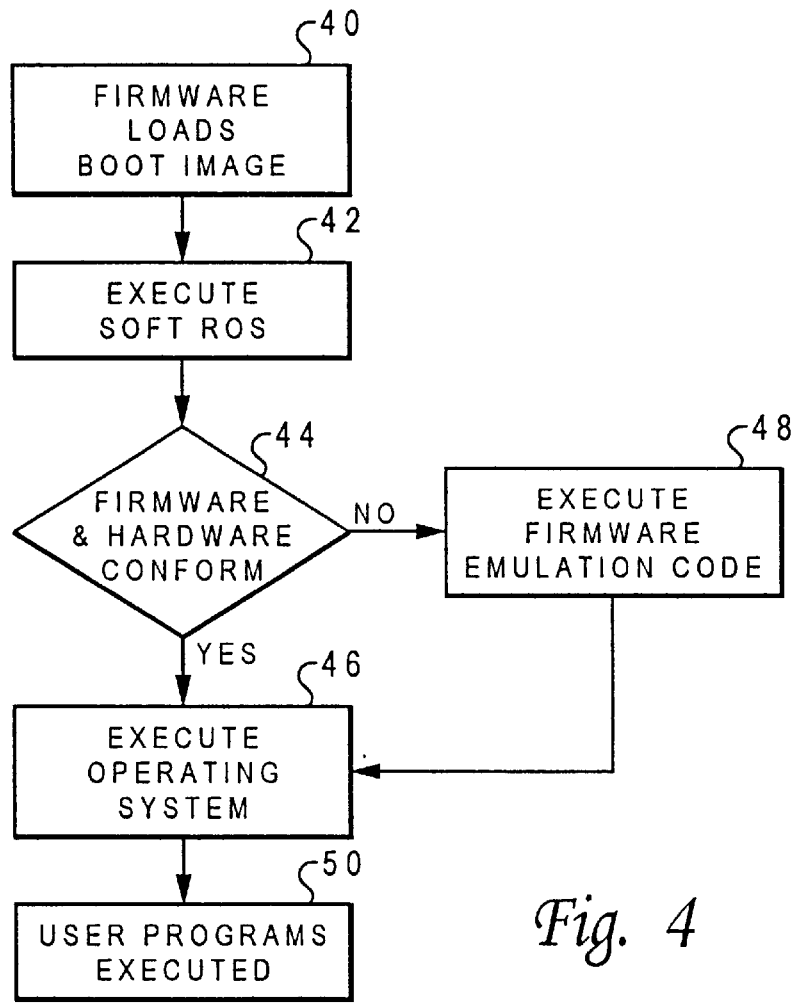
FIG. 4 is a flow chart depicting the basic boot sequence according to the present invention, using "soft" firmware.

With reference now to FIG. 4, there is depicted a flow chart showing how an operating system is installed according to the present invention. As with prior-art operating systems, the operating system of the present invention is loaded as part of a "boot" sequence that begins (when the computer is first turned on or in response to a soft boot command) with the firmware seeking an operating system on one of the storage devices, e.g., a floppy diskette (40). In the present invention, however, a boot image is provided which not only has the operating system, but further has a novel component, namely, an executable file that acts as an interface between the firmware and the operating system. This component may be referred to as "soft ROS" or "soft firmware" because it has functionality similar to the firmware ROS, but it is provided as software on the media that also contains the operating system. The boot image is designed to execute the soft ROS immediately upon transfer of the firmware control to the boot image (42). The soft ROS then determines whether the firmware and hardware conform to a pre-defined interface for the operating system, and whether the initial state requirements conform to that operating system (44). if so, and no modification of the firmware functionality is otherwise required, then the soft ROS passes control to the operating system, which then executes (46). If, however, the firmware does not conform to that interface, then a firmware emulation module (contained in the soft ROS) executes before the operating system (48). This firmware emulation code provides the operating system with any dependencies missing from the system firmware. The operating system is then executed (46). Thereafter, the operating system allows other application layers to be added, i.e., user software programs (50).

This method isolates the operating system from firmware dependencies and simplifies the effort to port operating systems to new models. A vendor can put its own soft ROS on the boot image, so that the configuration data can be reformatted into a standardized interface. The interface definition for the firmware includes the initial state of system hardware and the format of information to be provided by the firmware. These parameters are known ahead of time, since the vendor of the particular hardware platform provides a soft ROS to make its firmware conform to the operating system's specifications. Alternatively, the soft ROS can examine the system to check for expected data strings or special values loaded at predetermined locations. This approach simplifies testing, because of the modular nature of the soft ROS, such that only testing of new platforms is required. It is also useful in fixing problems with existing firmware, since a patch can be applied via the soft ROS. The soft ROS may even translate a firmware interface from one system architecture to the interface known by the operating system.

Figure 5:
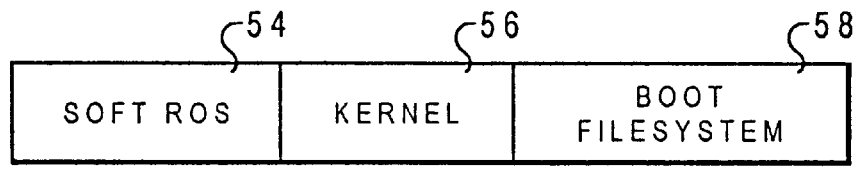
FIG. 5 is a representation of a boot image according to the present invention which is adapted for use with a UNIX-type workstation.

FIG. 5 illustrates how the present invention might be implemented for a UNIX-type operating system. A novel boot image 52 is provided, the front of which has the soft ROS (i.e., so that it is executed first), and which also has a kernel 56 and a boot filesystem 58. Kernel 56 is configured for a pre-defined firmware interface, which soft ROS 54 provides if the machine's firmware is non-conforming. The advantages of this approach are numerous. First, it localizes all dependencies on firmware to one module, simplifying transfer to new firmware models. Second, it facilitates supporting a model without modifying operating system source (kernel 56), because the OS/firmware interface is clearly defined, and the soft firmware is a separate executable. This aspect of the invention allows third-party developers to port an operating system to their platform without licensing the source code for the operating system or developing knowledge of OS internals. Finally it makes it easier to introduce fixes for firmware/hardware problems, with a software update, which is much simpler (and less expensive) than servicing the firmware.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A method of loading an operating system for a computer having a memory device, firmware, and a processor, the method comprising the steps, carried out by the processor, of:

determining whether the firmware conforms to a pre-defined operating system interface;

executing firmware emulation code if the firmware does not conform to the pre-defined interface; and loading, into the memory device, an operating system which uses the pre-defined interface.

2. The method of claim 1 wherein the firmware emulation code provides missing dependencies of the firmware to the operating system.

3. The method of claim 1 wherein the firmware emulation code provides a fix for a defect in the firmware to the operating system.

4. The method of claim 1 wherein the firmware emulation code translates a function of the firmware to the pre-defined interface.

5. The method of claim 1 wherein said determining step includes the step of examining the format of information provided by the firmware.

6. The method of claim 1 wherein:

the computer is a UNIX-type workstation;

the operating system includes a kernel and a boot filesystem; and the operating system is loaded by storing the kernel in a primary memory portion of the memory device.

7. The method of claim 6 further comprising the earlier step of loading a boot image into the memory device, the boot image having instructions for determining whether the firmware conforms to the pre-defined interface, and having the kernel and the boot filesystem.

8. The method of claim 1 further comprising the earlier step of loading a boot image into the memory device, the boot image having instructions for determining whether the firmware conforms to the pre-defined interface.

9. The method of claim 8 wherein the boot image is loaded in response to the processor executing instructions from the firmware and seeking an operating system.

10. The method of claim 9 wherein the computer further has an input device and said seeking step is performed by scanning a media located in the input device, the media containing the boot image.

11. A computer system comprising:

a processor;

a memory device connected to said processor;

an input device connected to said processor firmware connected to said processor, said firmware having instructions for seeking an operation system from said input device; and a media located in said input device, said media having a boot image which includes an operating system, firmware emulation code, and instructions for (i) determining whether said firmware conforms to a pre-defined operating system interface, (ii) executing said firmware emulation code if said firmware does not conform to the pre-defined interface, and (iii) loading, into said memory device, an operating system which uses the pre-defined interface.

12. The computer system of claim 11 wherein said firmware emulation code provides missing dependencies of said firmware to said operating system.

13. The computer system of claim 11 wherein said firmware emulation code provides a fix for a defect in said firmware to said operating system.

14. The computer system of claim 11 wherein said firmware emulation code translates a function of the firmware to said pre-defined interface.

15. The computer system of claim 11 wherein:

the computer is a UNIX-type workstation; and said operating system includes a kernel and a boot filesystem.

16. The computer system of claim 11 wherein the memory device is random-access memory.

17. The computer system of claim 11 wherein said media is removable from said input device.

* * * * *

UNITED STATES PATENT AND TRADEMARK OFFICE
CERTIFICATE OF CORRECTION

PATENT NO. : 5,918,048
DATED : June 29, 1999
INVENTOR(S) : Mealey et al.

It is certified that error appears in the above-identified patent and that said Letters Patent is hereby corrected as shown below:

Column 1, Line 29: Please delete the number 20.

Column 6, Line 9: Please add a ";" after the word "processor", and begin a new paragraph with the word "firmware".

Signed and Sealed this

Eighth Day of February, 2000

*Attest:*

Q. TODD DICKINSON

*Attesting Officer*  Commissioner of Patents and Trademarks